United States Patent [19]

El-Saie et al.

[11] Patent Number: 4,676,810
[45] Date of Patent: Jun. 30, 1987

[54] REVOLVING SEPARATOR

[75] Inventors: Ahmed A. El-Saie, Venetia; David W. Campbell, Bethel Park, both of Pa.

[73] Assignee: Conoco Inc., Wilmington, Del.

[21] Appl. No.: 876,058

[22] Filed: Jun. 19, 1986

[51] Int. Cl.⁴ ............................................. B01D 19/00
[52] U.S. Cl. ........................................ 55/203; 55/398
[58] Field of Search .................................. 55/201–203, 55/206, 393, 398, 403, 401

[56] References Cited

U.S. PATENT DOCUMENTS 2,219,377 10/1940 Anderson ...................... 55/393 X
3,054,246 9/1962 Jennings ........................ 55/201 X

*Primary Examiner*—Charles Hart
*Attorney, Agent, or Firm*—Cortlan R. Schupbach

[57] ABSTRACT

Slurries containing solid liquids and gases are continuously separated into individual components utilizing a revolving vanes on an eccentric axis. The vanes are of a flexible material which revolve sufficiently slowly that in sequence gas escapes through an overhead mesh, water is separated through a lower mesh and solids exit through a lower opening. The slurry input is from the axis plane overhead of the axis and input rate is balanced with gas, water and solids output.

6 Claims, 4 Drawing Figures

REVOLVING SEPARATOR

This invention relates to a method for separating slurries containing solids, liquids and gases. More specifically, this invention relates to an apparatus for continuously separating liquid/solid/gas slurries utilizing revolving vanes on an eccentric axis while recovering gases overhead, water through a lower mesh opening and solids through a lower opening.

THE PRIOR ART

Many uses exist today for a separator which will separate slurries containing gases, solids and liquids into their individual components reliably and continuously. An example of such an application is in the underground drilling of coal seams utilizing a hydraulically driven bit, wherein solid cuttings are washed in the powering fluid from the bore face and wherein the fluid also entrains gases such as natural gas and the like from the coal seam. In many instances, removal of the gas is necessary for safety reasons and recovery of the fluid for further powering of the drill bit would be beneficial. Thus it is necessary to have a reliable, continuous method for separating solids from liquids from gases and recovering the same.

It is known that separation occurs in the slurry system consisting of suspended material and liquid, and further that gases separate from such a system when such a system has a quiet zone in which such separation can occur. However, such zones require a large amount of space, which often is not available such as on off-shore drilling platforms and in underground mines. Many attempts have been made in the art to provide such a method for separating or clarifying fluids. Representative but nonexhaustive examples of the same are German Pat. No. 1049363 which separates gases from liquids utilizing a hollow rotor disposed eccentrically on a vertical axis or cylindrical casing having feed or outlet ducts. The vanes utilized do not contact the walls of the enclosure and the use of the apparatus does not contemplate the separation of solids as well as separation of gas from liquids. U.S. Pat. No. 3,857,490 shows pneumatic conveying of coal and other materials utilizing rapidly revolving vanes. U.S. Pat. No. 2,751,633 removes dense materials from lighter materials utilizing a rotatably mounted shaft equipped with vanes made of leather or other flexible material. The apparatus is taught to be effective for slowly and continuously scraping a heavy material into a receptacle.

In addition, many references exist wherein gases are removed from slurries or solids are removed from liquids. However, when it is necessary to separate all three components the art is noticeably deficient. Representative but non-exhaustive examples of such art include U.S. Pat. Nos. 2,500,056, 3,973,930, 4,411,673 and 4,436,618.

It would therefore be of great benefit to provide a reliable, continuous apparatus for continuously separating solids, liquids and gases from slurries containing such components.

THE PRESENT INVENTION

We have now discovered that liquid and solid components optionally containing gas can be continuously separated from a slurry input containing these components utilizing an apparatus comprising (a) a cylindrical separation chamber disposed substantially horizontally and having fluid impermeable ends, wherein the cylinder walls are impermeable and contain an upper aperture covered with a mesh, a lower aperture covered with a mesh and an opening in said walls disposed above said lower aperture and below said upper aperture;

(b) flexible revolving vanes disposed rotatably and eccentrically on an axis within said cylinder such that each rotation will alternately flex and extend said vane;

(c) slurry input means at the upper portion of said cylinder, said means penetrating said fluid impermeable end;

(d) gas removal means above said upper mesh covered aperture wherein said means have a substantially gas-impermeable connection with said aperture;

(e) fluid removal means disposed below and connected to said lower mesh covered aperture, and (f) solids removal means disposed adjacent and connected to said wall opening disposed between said upper and lower mesh covered means; wherein (g) incoming slurry is placed into compartments formed by said flexible rotating vanes at the upper portion of said horizontally disposed cylinder and gases escape through said upper mesh covered opening;

(h) solid/liquid slurry is compressed by vane rotation on the eccentric axis and liquid is forced through said lower mesh covered opening; and (i) solids are discharged through said wall opening disposed between the upper and lower meshed covered openings by continued vane rotation about the eccentrically disposed axis.

The apparatus above described permits safe, effective and continuous separation of components and is operable in limited space, providing in addition recycle fluid and gas recovery when necessary.

The invention is more concretely described with reference to the drawing below. Those skilled in this art will realize that many variations can be made to the apparatus described and that the drawings shown are for general description of the instant apparatus.

DETAILED DESCRIPTION OF THE DRAWING

Figure 1:
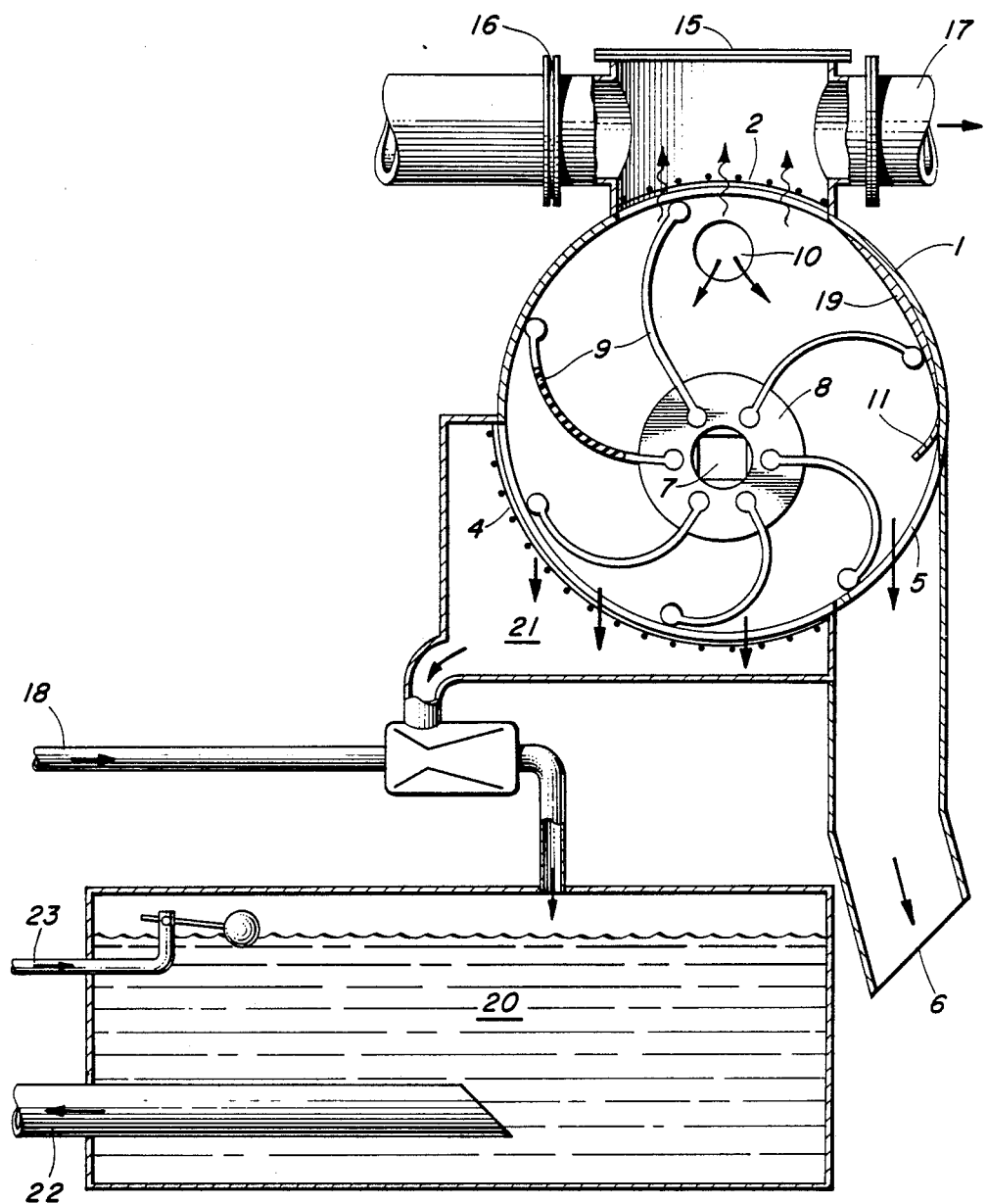
FIG. 1 is a cutaway side view showing the overall apparatus of the present invention, including a preferential reduced pressure zone beneath the fluid removal means.

FIG. 1 shows a substantially cylindrical separation chamber which is substantially horizontally disposed and having fluid impermeable ends. Cylinder walls (1) are impermeable and contain an upper aperture covered with a mesh or screen (2), further containing a lower aperture (4) which is covered by a screen. An opening (5) is connected to a solids outlet means (6) for removal of separated solids.

The horizontally disposed cylinder or separating chamber has disposed therein an eccentrically placed axis (7) having affixed thereto vanes holder (8) such that said vanes holder (8) rotates with eccentrically disposed axis (7). The vanes holder contains replaceable vanes (9) which are flexible and contact the substantially horizontal separation cylindrical chamber at all points during the rotation.

The cylindrical separation chamber (1) having fluid impermeable ends is penetrated through at least one end substantially above said eccentrically disposed axis with slurry input apertures (10) which inputs two- or three-component slurry containing liquid and solids and optionally gas into the compartments formed between said rotating vanes (9). Optionally, a slurry removal flange (11) is provided to clean the vanes.

The upper mesh covered aperture (2) is capped by a gas collector means (15) preferentially containing a rupture disk (16) and means to remove recovered gas (17).

A lower mesh covered aperture (4) is utilized for removing liquids. Liquids can be recycled by a pump to a reservoir or disposal, or pass directly into a liquid reservoir (20). It is preferred to use a venturi pump to produce a reduced pressure in enclosure means (21) to enhance liquid separation during the rotation of vanes (9). Liquid is discharged through line (22) and can optionally be reused in drilling or disposal or forced through the venturi via line (18) to reduce pressure and enhance liquid separation. Power to shaft (7) is provided from any convenient source, including direct drive motors, belt or chain driven remote motors and the like. In a preferred embodiment, vane seal to the wall during rotation of the vanes is improved by providing an eccentricity (19) in the wall inside radius to further compress the vane and enhance the seal between the vane and the wall. Make up water is added via line (23) as necessary to keep the reservoir at a predetermined level.

Figure 2:
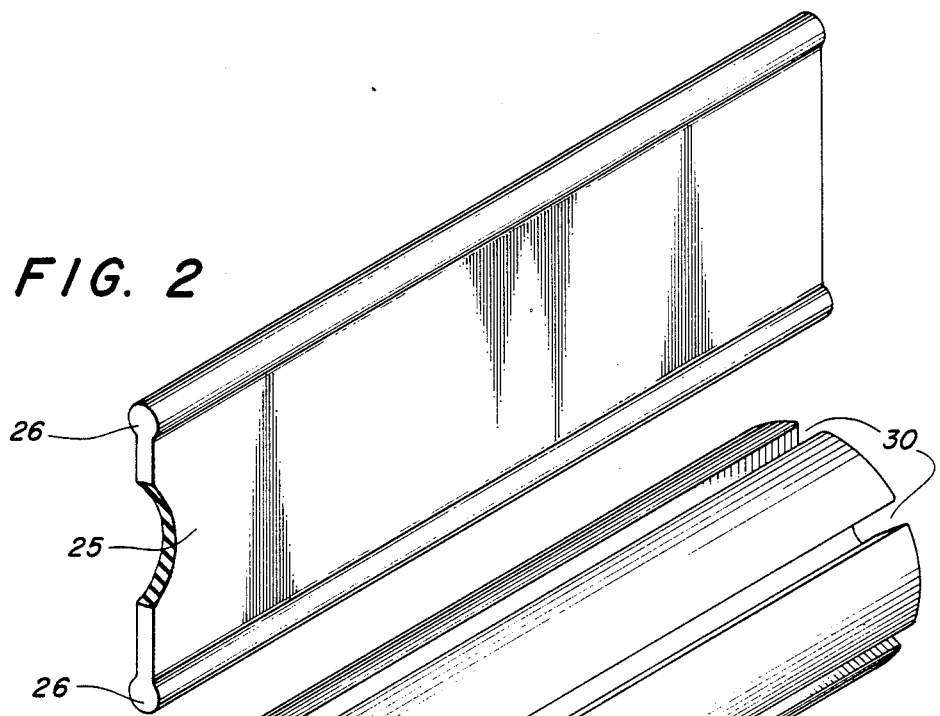
FIG. 2 shows a preferred vane configuration of the present invention utilizing vanes which are reversible for extended wear.

FIG. 2 shows a preferred vane configuration wherein a replaceable flexible vane made of nylon, natural rubber, polyurethane, buna neoprene or other elastomeric, wear-resistant materials is shown. The vane (25) is shown with enlarged edges (26) which extend the width of the vane, said width being substantially equivalent to the length of the separating cylindrical chamber. The enlarged ends (26) allows easy insertion into the vanes holder (8) whenever the vanes require replacement. Thus the life of the vanes can be substantially doubled by simply inverting the vanes (25) in the vane holder (8).

Figure 3:
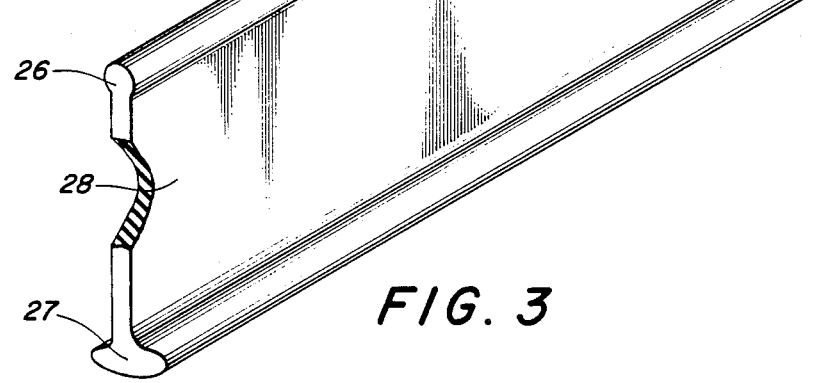
FIG. 3 shows a vane configuration which can be utilized in high wear applications showing enhanced material at the vane tip.

FIG. 3 shows a second vane configuration (28) wherein the vane has an enlarged end (26) configured to fit in vane holder (8). The vane is molded especially for high wear applications, having an oversized edge (called a wear edge) (27) to allow longer service before slurry components can pass the edge.

Figure 4:
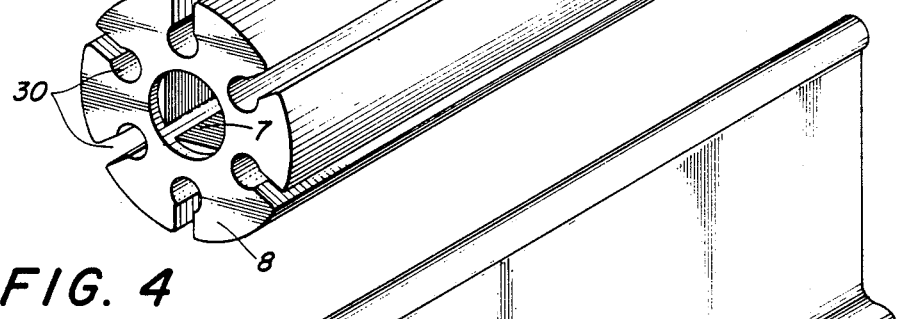
FIG. 4 shows a preferred vanes holder of the present invention utilizing simple replacement of the vanes when wear makes such replacement necessary.

FIG. 4 shows a vanes holder of the instant invention (8) having formed therein multiple slots for containing replaceable vanes (30). Vane holder is designed to fit around shaft (7) and to be affixed thereto, such that rotation of shaft (7) will revolve vane holder (8) and attached vanes in vane slots (30). Thus, in utilizing the apparatus of the present invention, liquid enters the compartments formed by the vanes rotating on the eccentrically exposed axis and are compressed near the upper aperture in order to allow gas to escape. As the vanes continue rotation, compression increases, forcing liquid from the slurry, which liquid exits through the preferential partial vacuum means disposed below the lower mesh covered opening. As the vanes continue their rotation, compression decreases and the solids are allowed to fall from the outlet chute. As the vanes pass the opening for solids (5) the solids removal flange (11) assists in removing solid material from the vanes in order that essentially no solids continue traversing around the axis (7).

Removed liquid is transferred to a liquid reservoir (20) for reuse such as in drilling, or recycle to a venturi pump to reduce pressure, or disposed. Such disposal or recycle is not critical to the apparatus.

The revolving vanes of the present invention can be formed to fit in a vane holder or can be simply bolted into a rigid support near the revolving axis. In a preferred embodiment of the present invention, the vane holder is designed to take a vane having an enlarged edge, wherein the holder grips the enlarged edge and allows the vane to flexibly revolve about the axis. In high wear situations, a vane having an enhanced edge (27) as set forth in FIG. 4 can be used.

In order to provide a better seal and reduce wear, it is preferred that the fluid impermeable ends and/or the solid portions of the substantially cylindrical separation chamber be coated or covered with a wear-reducing material such as polymers and coatings known for such purposes, as represented by nylon, polyurethane Teflon (trademark of and sold by E. I. Du Pont) and the like.

Recovered reservoir fluid can be reused for drilling or disposed as desired. Normally recovered fluid will at least be fractionally recycled through the venturi apparatus in order to enhance liquid separation by reduced pressure. The apparatus of the present invention can be built from suitable materials well known to those skilled in the art and can be designed to separate necessary quantities of slurry produced. The apparatus has the advantage of being easily made from materials commonly available and functions effectively in a limited space.

The meshes covering the upper gas removal aperture and lower fluid removal aperture can be of any effective size and type. However, it is preferred that a V wire screen be utilized as this provides effective separation capabilities and certain anticlogging tendencies not found in essentially horizontal screen. Representative examples of such meshes are those sold by Johnson Division of Signal Environmental System Inc. Industrial Screen Dept. and mesh openings are used to effectively separate the mixtures.

While certain embodiments and details have been shown for the purpose of illustrating this invention, it will be apparent to those skilled in this art that various changes and modifications may be made herein without departing from the spirit or scope of the invention.

We claim:

1. An apparatus capable of continuously separating gas, liquid and solid components from a slurry input containing said components, comprising
   (a) a cylindrical separation chamber disposed substantially horizontally and having fluid impermeable ends wherein the cylinder walls are impermeable and contain an upper aperture covered with a mesh, a lower aperature covered with a mesh and an opening in said walls disposed above said lower aperature and below said upper aperature;
   (b) flexible revolving vanes disposed rotatably and eccentrically on an axis within said cylinder such that each rotation will alternately flex and extend said vane;

(c) slurry input means at the upper portion of said cylinder, said means penetrating said fluid impermeable end;

(d) gas removal means above said upper mesh covered aperture wherein said means have a substantially gas-impermeable connection with said aperture;

(e) fluid removal means disposed below and connected to said lower mesh covered aperture, and (f) solids removal means disposed adjacent and connected to said wall opening disposed between said upper and lower mesh covered means; wherein (g) incoming slurry is placed into compartments formed by said flexible rotating vanes at the upper portion of said horizontally disposed cylinder and gases escape through said upper mesh covered opening;

(h) solid/liquid slurry is compressed by vane rotation on the eccentric axis and liquid is forced through said lower mesh covered opening; and (i) solids are discharged through said wall opening disposed between the upper and lower meshed covered openings by continued vane rotation about the eccentrically disposed axis.

2. An apparatus as described in claim 1 wherein the removed liquid is transferred to a liquid level controlled reservoir or disposed.

3. An apparatus as described in claim 2 wherein liquid reservoir is fluidly connected to the pressure-reducing venturi means such that reduced pressure enhances liquid separation.

4. An apparatus as described in claims 1 or 2 wherein the fluid removal means are enclosed in a means capable of providing reduced pressure below said mesh-covered apertures of (e).

5. An apparatus as described in claim 4 wherein the reduced pressure is provided by venturi pumps.

6. An apparatus as described in claim 1 wherein the flexible vanes are rigidly supported near the revolving axis.

* * * * *